United States Patent
Stählin et al.

(10) Patent No.: US 9,237,599 B2
(45) Date of Patent: Jan. 12, 2016

(54) CONTROLLER IN BIDIRECTIONAL ADHOC NETWORK RADIO COMMUNICATION

(75) Inventors: Ulrich Stählin, Eschborn (DE); Alfred Eckert, Mainz-Hechtsheim (DE); Jürgen Diebold, Eschborn (DE); Stefan Lüke, Olpe (DE); Helmut Windl, Bad Abbach (DE)

(73) Assignees: Continental Teves AG & Co. oHG (DE); Continental Automotive GmbH (DE)

(*) Notice: Subject to any disclaimer, the term of this patent is extended or adjusted under 35 U.S.C. 154(b) by 336 days.

(21) Appl. No.: 13/529,414

(22) Filed: Jun. 21, 2012

(65) Prior Publication Data

US 2013/0170399 A1 Jul. 4, 2013

Related U.S. Application Data

(63) Continuation of application No. 13/319,436, filed as application No. PCT/EP2010/056467 on May 11, 2010, now abandoned.

(30) Foreign Application Priority Data

May 11, 2009 (DE) .......................... 10 2009 003 010
May 29, 2009 (DE) .......................... 10 2009 026 578

(51) Int. Cl.
*H04B 7/00* (2006.01)
*H04W 84/18* (2009.01)
(Continued)

(52) U.S. Cl.
CPC ............ *H04W 84/18* (2013.01); *H04W 84/005* (2013.01); *H04W 4/046* (2013.01)

(58) Field of Classification Search
CPC ... H04W 4/046; H04W 84/005; H04W 84/18; H04W 40/20; G06F 17/00; G08G 1/096791; G08G 1/161

USPC .......... 370/310, 312, 313, 255; 340/901, 902, 340/903, 904–905
See application file for complete search history.

(56) References Cited

U.S. PATENT DOCUMENTS 6,430,164 B1 * 8/2002 Jones et al. ................... 370/313
2002/0143969 A1 10/2002 Loy
(Continued)

FOREIGN PATENT DOCUMENTS

DE            10344008 A1     4/2005
WO     WO-2007097689 A1     8/2007
(Continued)

OTHER PUBLICATIONS

Timo Kosch, D31 European ITS Communication Architecture Overall Framework, 2008, COMeSafety.*
(Continued)

*Primary Examiner* — Kwang B Yao
*Assistant Examiner* — Harun Chowdhury
(74) *Attorney, Agent, or Firm* — RatnerPrestia

(57) ABSTRACT

The invention describes a controller for data processing in bidirectional adhoc-network radio communication with a computation unit for data processing and ports for data input and data output. The computation unit is set up to process the data according to the ITS standard, wherein the data processing is limited to processing steps of the ITS Facility layer, which performs content-oriented evaluation and/or conditioning of the data which are received or need to be sent by means of the bidirectional adhoc-network radio communication, and a first wideband communication port is provided at least for receiving the data from an ITS communication unit for the purpose of bidirectional adhoc-network radio communication.

9 Claims, 2 Drawing Sheets

(51) Int. Cl.
*H04W 84/00* (2009.01)
*H04W 4/04* (2009.01)

(56) References Cited

U.S. PATENT DOCUMENTS

| | | |
|---|---|---|
| 2005/0085953 A1 | 4/2005 | Hoenninger |
| 2009/0125193 A1* | 5/2009 | Fernandez ............ 701/48 |
| 2011/0047338 A1 | 2/2011 | Stählin |
| 2011/0071756 A1 | 3/2011 | Stählin |
| 2011/0098877 A1 | 4/2011 | Stählin |
| 2013/0342368 A1* | 12/2013 | Nathanson ............ 340/903 |

FOREIGN PATENT DOCUMENTS

| | | |
|---|---|---|
| WO | WO-2009030522 A1 | 3/2009 |
| WO | WO-2009074655 A1 | 6/2009 |
| WO | WO-2009133185 A1 | 11/2009 |

OTHER PUBLICATIONS

International Application Serial No. PCT/EP2010/056467, International Search Report filed Sep. 1, 2010, 2 pgs.

* cited by examiner

CONTROLLER IN BIDIRECTIONAL ADHOC NETWORK RADIO COMMUNICATION

CROSS REFERENCE TO RELATED APPLICATIONS

This application is a Continuation Application of U.S. application Ser. No. 13/319,436, filed Nov. 8, 2011, which is the U.S. National Phase Application of PCT International Application No. PCT/EP2010/056467, filed May 11, 2010, which claims priority to German Patent Application No. 10 2009 003 010.7, filed May 11, 2009, and German Patent Application No. 10 2009 026 578.3, filed May 29, 2009, the contents of such applications being incorporated by reference herein.

FIELD OF THE INVENTION

The invention relates to a controller for data processing in bidirectional adhoc-network radio communication, particularly in the course of vehicle-to-vehicle (C2C) or vehicle-to-surroundings (C2X) communication, which also encompasses C2C communication as a special case. The controller usually has a computation unit for data processing and ports for data input and data output.

BACKGROUND OF THE INVENTION

Controllers of this kind are used in practice in order to receive and evaluate or condition and transmit data in bidirectional adhoc-network radio communication. In this connection, WO 2009/074655 A1, which is incorporated by reference, discloses a central control unit which provides the computation power for a multiplicity of connected sensors and applications. This control unit also has communication units provided with antennas connected to it which may have been set up to participate in different data networks. However, there is the drawback that the control unit is of large-scale integrated design and needs to have a very high computation power. Furthermore, the entire onboard electronics and the communication system are disrupted in the event of the central control unit failing.

A similar design for a communication system is known from WO 2009/030522, which is incorporated by reference, in which a communication unit having an antenna is respectively connected to a central computation unit in a vehicle, said central computation unit operating as the central computation unit for the vehicle. The communication unit is set up for vehicle-to-vehicle or vehicle-to-surroundings communication. The central computation unit uses the data obtained from the vehicle-to-vehicle or vehicle-to-surroundings communication in order to compare them with position data, for example from a satellite positioning system or other vehicle sensors, and to update maps administrated in the vehicle by aligning these obtained data. This also involves the use of position values for the communication partners in the vehicle-to-vehicle communication.

In this connection, WO 2009/133185 A1, which is incorporated by reference, also discloses a self-learning map and an apparatus for creating and storing a digital map of this kind which is created on the basis of ambient sensors, vehicle-to-surroundings communication and satellite navigation systems, without this involving the need to use navigation map data. The digital map is improved iteratively and can be used for checking the validity of an already existing digital map for a driver assistance system. In this case too, a central computation unit with a port to the different sensors is provided.

One problem with these central computation units is the high demand for computation power, which requires the use of complex processors. These computation units are therefore comparatively expensive. In practice, this results in a large number of car buyers deciding against the use of such high-end communication systems. It is therefore desirable to provide systems which provide the necessary computation power when required and can be retrofitted in vehicles as appropriate.

SUMMARY OF THE INVENTION

It is thus an object of the invention to provide a controller for data processing in bidirectional adhoc-network radio communication which improves the scalability of the systems and the evaluation of associated information inexpensively.

The invention achieves this object by means of a controller according to a controller for data processing in bidirectional adhoc-network radio communication with a computation unit for data processing and ports for data input and data output, wherein the computation unit is set up to process the data according to the ITS standard, wherein the data processing is limited to processing steps of the ITS Facility layer, which performs content-oriented evaluation and/or conditioning of the data which are received or need to be sent by means of the bidirectional adhoc-network radio communication, and in that a first wideband communication port is provided at least for receiving the data from an ITS communication unit for the purpose of bidirectional adhoc-network radio communication. In this regard, the controller of the type cited at the outset has particular provision for the computation unit of the controller to be set up to process data according to the ITS standard, wherein the data processing according to the ITS standard is limited to content-oriented evaluation and/or conditioning of the data which are received or need to be sent by means of the bidirectional adhoc-network radio communication, particularly by means of DSRC and/or ITS-G5. The invention does not aim to perform any tasks linked to the performance of the actual communication, i.e. the application in the network and the sending and receiving of the data, in the course of the with the bidirectional adhoc-network radio communication.

These tasks are reserved for an ITS communication unit which is provided outside of this controller according to aspects of the invention. In order to allow reliable and fast data interchange with this ITS communication unit, the controller according to aspects of the invention also has a wideband first communication port, for example USB, Ethernet, MOST databus, Flexray, CAN or the like, at least for receiving data from an ITS communication unit for the purpose of bidirectional adhoc-network radio communication. This ITS communication unit may be integrated in an intelligent antenna, for example, which is present in the vehicle as a central vehicle unit for implementing the radio communication and has an antenna for bidirectional adhoc-network radio communication by means of DSRC (Dedicated Short Range Communication) or IST-G5, an antenna for satellite radio communication, particularly for receiving satellite position signals, and possibly an antenna for cellular radio communication in a public mobile radio network. The controller according to aspects of the invention is then connected to this intelligent antenna and the ITS communication unit provided therein by means of the wideband communication port.

As part of the ITS standard, the ITS communication unit has, in particular, the modules ITS Access, ITS Network and ITS Transport which are required for implementing the radio communication, said modules preferably directly organizing the setup of a bidirectional adhoc network by means of radio communication with other subscribers and performing the data interchange. These ITS modules as part of the DSRC and ITS-G5 communication may preferably be implemented in a single processor. In this case, the controller according to aspects of the invention for processing the data in bidirectional adhoc-network radio communication performs preprocessing steps, in particular, for the purpose of preprocessing.

In addition, the ITS Facilities layer may have been integrated with applications and/or the ITS Applications layer into the control unit according to aspects of the present invention in order to process vehicle-related and safety-related data. The processing encompasses both the evaluation of the data received in the course of bidirectional adhoc-network radio communication and the preparation of data for transmission by means of this bidirectional adhoc-network radio communication.

These are the application-oriented data, which means that the ITS Facilities or ITS Applications layer represents the topmost layer in the ITS standard, which layer allows the interface between the ITS system and the vehicle and provides data which can be used by other vehicle devices, particularly driver assistance systems and other safety-related devices. By contrast, the ITS communication unit comprises particularly the conditioning of the data for the actual transmission or communication, i.e. the sending and receiving of the data. This is usually implemented in lower layers of the ITS protocol as part of the ITS configuration. According to aspects of the invention, these communication tasks are thus specifically not intended to be performed with the computation unit of the controller for the purpose of data processing. The controller according to aspects of the invention is subsequently also called the ITS sensor.

The ITS communication unit is therefore preferably jointly integrated in an antenna unit or once again connected upstream of the latter, as a result of which the antenna unit is connected particularly to the antenna for bidirectional adhoc-network radio communication via the ITS communication unit with the ITS sensor and the ITS components integrated in the computation unit thereof.

It is naturally possible for this wideband communication port to be used in parallel not only for receiving data from an ITS communication unit but also for transmitting data to the ITS communication unit, which then transmits these data to the bidirectional adhoc network by means of radio communication. However, this also requires a portion of the bandwidth for transmitting the data, which means that the reception of data via this wideband communication port is sometimes delayed in time. Therefore, the invention may provide a second communication port for sending data to the ITS communication unit for the purpose of bidirectional adhoc-network radio communication. This ITS communication unit then ensures that the data are transmitted to the adhoc network, i.e. to the subscribers in the communication network which are temporarily located in the reception range. This division of the communication ports for sending and receiving is particularly advantageous, since usually large volumes of data need to be received and processed as quickly as possible. This is possible by virtue of the wideband port according to aspects of the invention. The data to be sent are usually much less extensive, which means that a second communication port can be provided which may be in the form of a simple vehicle communication network, for example a bus with Flexray, a CAN bus or the like.

In addition, the invention may provide a satellite data port for receiving position data from a satellite-based locating system. These position data can naturally be provided as digitized data which could then possibly also be transmitted using the wideband first communication port provided in accordance with the invention. In this case, the satellite raw data are received by a separate satellite receiver with a dedicated satellite computation unit for evaluating the satellite raw signals.

However, greater flexibility is obtained if the satellite data port of the controller according to aspects of the invention is provided for receiving satellite raw data and is connected directly to the antenna device for receiving the satellite radio data, for example by means of an antenna cable. In this case, the controller has a computation unit or a processor for evaluating the satellite raw data, which computation unit or processor may be jointly integrated in the computation unit of the controller or in the form of a separate chip. The latter is advantageous, since the chips for satellite data evaluation are meanwhile available in large numbers and inexpensively.

In addition, the controller based on one preferred embodiment also has, in accordance with the invention, at least one port for a driving sensor for capturing dynamic vehicle data and/or an ambient sensor for capturing the vehicle surroundings, as a result of which one or more of these sensors are jointly integrated in the controller and the computation unit of the controller is at the same time set up to actuate these sensors. In accordance with the invention, the received sensor data are then also evaluated in the controller at the same time, as a result of which this controller can be used, as part of an ITS sensor, as a central safety control unit or device for the vehicle in which all data relating to vehicle safety are brought together and evaluated.

In this connection, the controller according to aspects of the invention or the computation unit thereof may also be set up to combine satellite position data and data from a vehicle sensor and/or ambient sensor. This allows improved driving dynamic states and improved positioning of the vehicle to be achieved. This combination of satellite position data and data from other vehicle sensors or ambient sensors can be achieved particularly flexibly and quickly when using satellite raw data, since these data are available particularly quickly and the evaluation is performed in target-oriented fashion in order to extract the requisite information from the satellite signals.

A particular advantage of integrating the ITS Facilities layer as part of the DSRC or ITS-G5 communication into a separate controller is also that this controller with its integrated computation unit can, in accordance with the invention, be set up on the basis of a high or higher SIL level (Safety Integrity Level) and therefore has a high safety level. This is necessary in order for the controller according to aspects of the invention (ITS sensor) to undertake safety-related functions as part of the driver assistance systems, which perform automatic braking operations or other driving interventions in order to increase traffic safety. Such a high SIL level cannot be achieved for communication applications, particularly for bidirectional adhoc-network radio communication, since these systems are frequently based on random developments and cannot ensure a high level of functional reliability.

In order to be able to present the results of the data processing by the controller according to aspects of the invention to the driver of the individual vehicle as well and to provide him with the opportunity to influence the data processing, the controller may also contain a port to a multimedia unit which may be implemented as part of the ordinary vehicle communication network.

In this connection, the computation unit of the controller according to aspects of the invention may be set up to merge data received from a multimedia unit, from a vehicle sensor, from an ambient sensor and/or by a bidirectional adhoc network and to produce preprocessed data therefrom according to the ITS standard, said data being able to be sent to an ITS communication unit which then transmits them to the bidirectional adhoc network by means of radio communication in order to make this information available to other road users. This may be safety-related information. However, this information can also be used simply for the purpose of information or for intelligent traffic management. In accordance with the invention, the computation unit may also be set up to perform preprocessing outside of the ITS standard, i.e. proprietary preprocessing, on the communication data.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
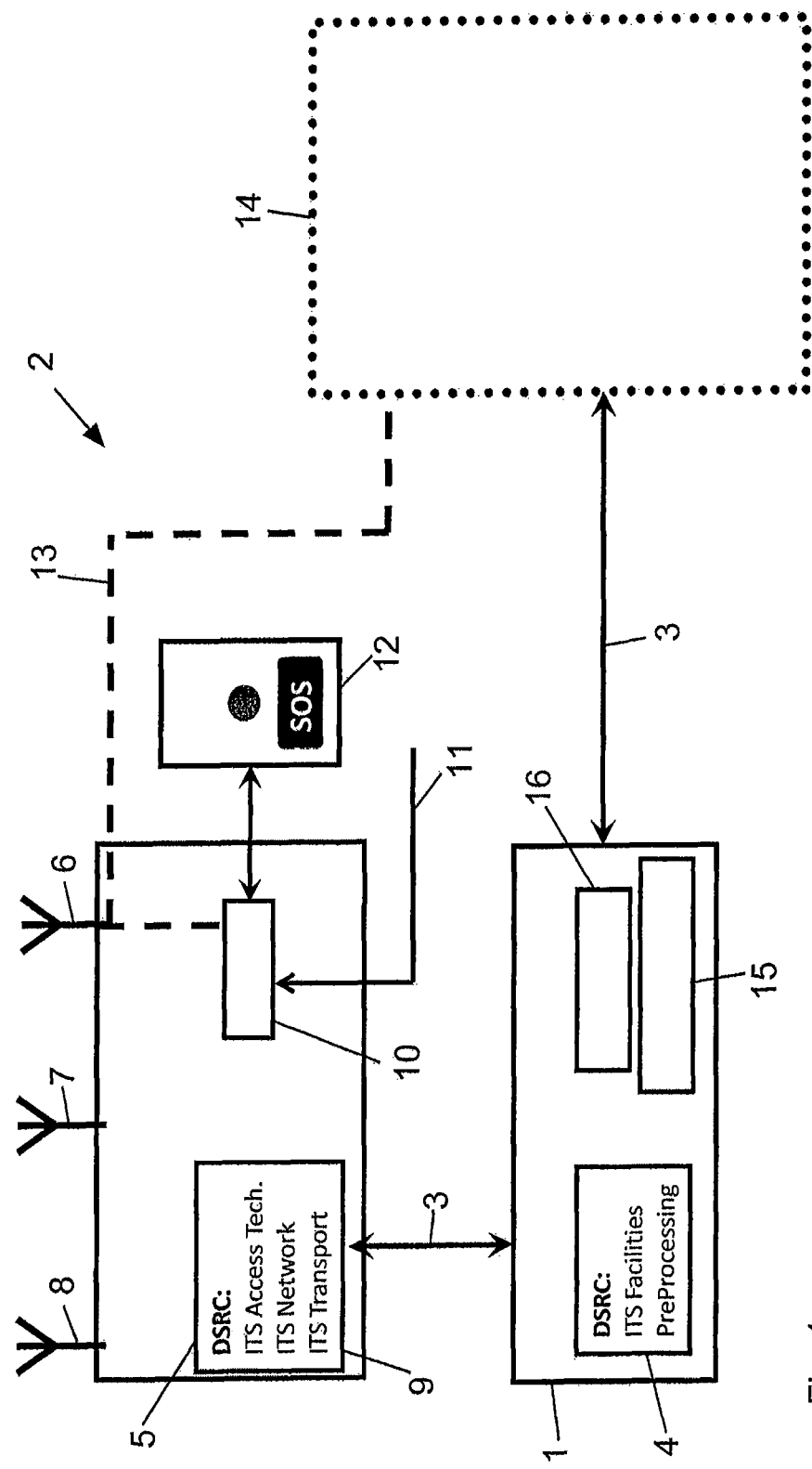
FIG. 1 shows the schematic design of a controller according to aspects of the invention in a vehicle communication network, and FIG. 2 schematically shows a flowchart for the inventive preprocessing of data according to the ITS standard in the ITS Facilities layer utilizing various information converging in the controller.

FIG. 1 shows a controller 1 according to aspects of the invention for data processing in the bidirectional adhoc-network radio communication, which controller is incorporated in a vehicle communication network 2.

The controller 1 has a computation unit—not shown separately in FIG. 1—for data processing and also ports 3 for data input and data output. The ports 3 are shown schematically in FIG. 1 as a logical connection and are not limited to precisely one port in each case. On the contrary, the communication port 3—which is shown as a line group—may contain different ports, including technically different ports for various tasks.

The computation unit of the controller 1 is set up, inter alia, to process data according to the ITS standard, the data processing according to the ITS standard being limited to content-oriented evaluation and/or conditioning of the data which are received or need to be sent by means of the bidirectional adhoc-network radio communication, particularly by means of DSRC or ITS-G5. This is illustrated by a portion 4 of the ITS-DSRC components, which comprise particularly the processing steps of the ITS Facilities layer and also data preprocessing (ITS Facilities and Preprocessing), with the ITS Facilities layer also being able to comprise the ITS applications from the ITS Applications layer.

In order to be actually able to participate in bidirectional adhoc-network radio communication, the controller 1 is connected to an intelligent antenna device 5 which has an antenna for cellular radio communication 6, an antenna for satellite radio communication 7 and an antenna for bidirectional adhoc-network radio communication 8. If different communication data can be combined in one antenna, it is not necessary for the intelligent antenna device 5 to have three separate antennas 5, 6, 7. These antennas 6 to 8 may then also be combined in one or two antennas.

The intelligent antenna device 5 is equipped with driver elements for performing the respective types of communication and also with a computation unit. In the example shown, the computation unit of the intelligent antenna device 5 incorporates a further ITS-DSRC or ITS-G5 component 9 which forms an ITS communication unit which undertakes the technical implementation of the actual communication according to the DSRC or ITS-G5 standard, i.e. the incorporation into the network and the sending and receiving of the data.

The intelligent antenna device 5 also incorporates an emergency call unit 10 which preferably contains a mobile radio unit and, in the event of a severe accident, transmits an emergency call via the cellular mobile radio network. To this end, the emergency call unit 10 receives an airbag trigger signal 11 and/or a trigger signal from a man/machine interface 12 in which the driver of a vehicle can send an emergency call manually. Accordingly, the emergency call unit 10 is connected to the antenna 6 for cellular radio communication by means of an antenna cable 13, which is shown in dashes.

The controller 1 according to aspects of the invention and the antenna 6 for the cellular radio communication are each connected by means of a port 3 and an antenna cable 13 to further vehicle components, which may include particularly a multimedia unit in the vehicle with a man/machine interface. These further vehicle units are provided with the reference symbol 14 across the board and may also, in particular, have a plurality of vehicle units which are connected to one another by means of a vehicle communication network.

The effect achieved on the basis of this proposed structure within the vehicle communication network 2 is that the ITS Facility layer is accommodated in a dedicated controller 1, which means that the controller 1 can be used particularly for evaluating safety-related data. This controller 1 therefore preferably also has ports 15 for vehicle sensors for capturing the vehicle dynamics and/or ambient sensors for capturing the vehicle surroundings, the data from which are concomitantly processed in the computation unit of the controller 1. In addition, the controller 1 may be connected by means of the ports 3 to the antenna 7 for satellite radio communication, which antenna transmits particularly satellite raw data to a positioning unit 16 in the controller 1. These raw data may also have already been digitized, i.e. the antenna 7 already has a transceiver with a simple processing unit connected to it.

The controller 1—which is also called an ITS sensor—forming a separate unit therefore has all the information and data from the bidirectional adhoc-network radio communication and the satellite radio communication and also from the dedicated vehicle sensors available in order to control and supply data to all safety-related applications in the vehicle. The controller 1 is therefore preferably implemented with a high SIL level, i.e. a high safety level, particularly with a higher SIL level than the intelligent antenna device with the ITS communication unit and the components ITS Access, ITS Network and ITS Transport which are required for the communication, for which components it is normally not possible to achieve such a high level of failsafety.

The driving dynamics sensors which are connected to the ports 15 for the vehicle sensors of the controller 1 measure wheel speeds, yaw rate, lateral acceleration, steering wheel angle and the like, in particular. The data from these driving dynamics sensors can be used with the GPS raw data from a satellite locating system in order to produce improved positioning and also improved driving dynamics states (speed, yaw rate, side slip angle and the like). The output 3 of the ITS sensor 1 provides these data for bidirectional adhoc-network radio communication (C2C, C2X radio communication) in appropriately preprocessed form, said data being transmitted via a port 3 to the ITS communication unit 9 and/or further vehicle units 14. For this, it is possible to use a data bus as part of the vehicle communication network 2. In addition, the ITS sensor also provides driving dynamics data from the sensor cluster connected to the ports 15, said driving dynamics data being able to be complemented by data from the positioning unit 16. Opportunities for this are described in WO 2009/133185 A1 and WO 2009/030522 A1.

A particular advantage of the proposed architecture arises from the division between communication with little safety relevance in the intelligent antenna device 5 and safety-critical data preprocessing in the controller 1 and the ITS-DSRC and ITS-G5 components 4 implemented in the computation unit of the controller 1. It is therefore also possible to exchange changing parts of the architecture, such as an antenna including the ITS communication unit 9, an ADAS controller or a multimedia controller, for further vehicle units 14 without needing to alter the ITS sensor with the safety-related data preprocessing. This improves scalability, since further terminals can be altered flexibly depending on the desired vehicle equipment without needing to alter those components integrated in the controller 1 which can be retrofitted only with difficulty.

Figure 2:
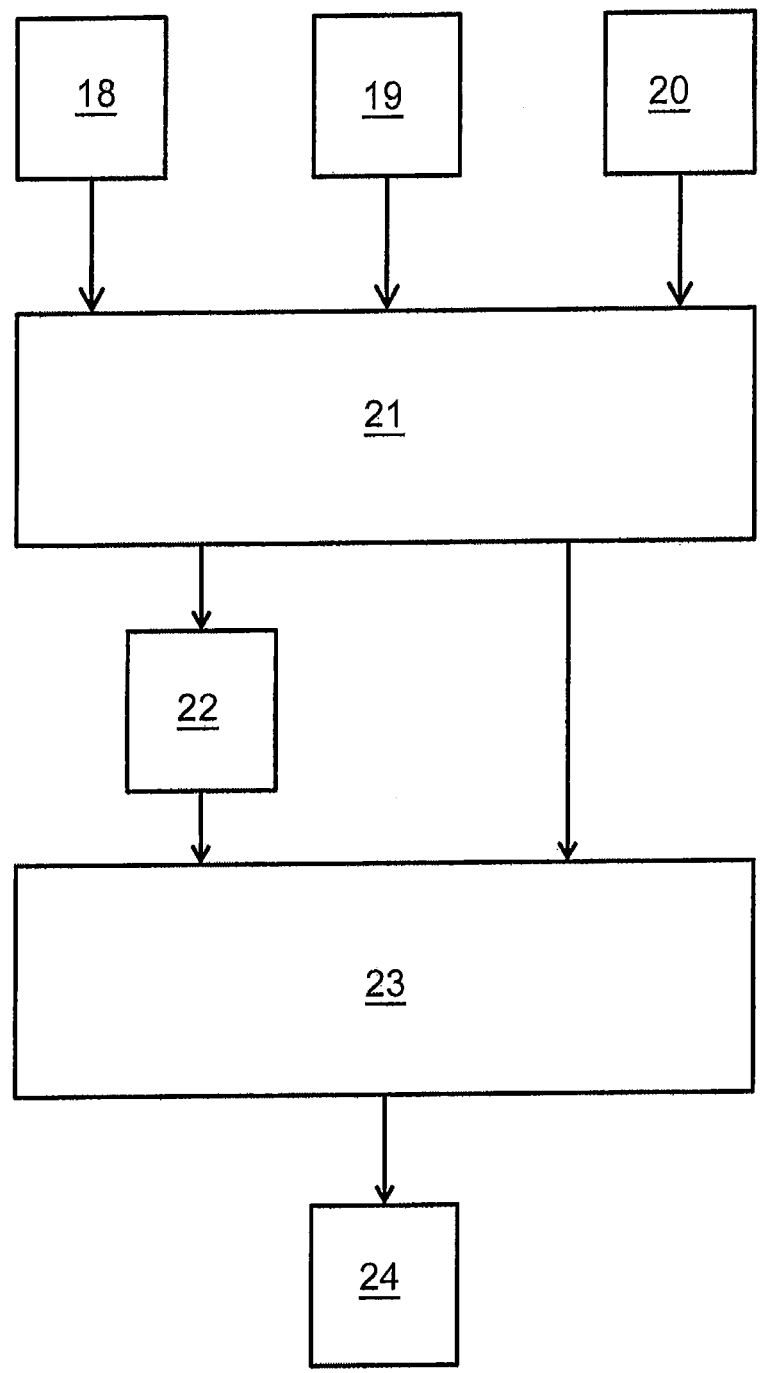

A more detailed explanation of a possible application of the system shown in FIG. 1 and the control unit 1 according to aspects of the invention is provided below with reference to FIG. 2.

The computation unit of the controller 1 receives information about a queue at the current vehicle position or on the chosen vehicle route by means of vehicle-to-vehicle communication 18, by means of data from vehicle ambient sensors 19 and by means of satellite locating data 20.

On the basis of the present prior art, such queue reports are typically recognized with the aid of detector loops in the road or camera monitoring by a control center and then forwarded to the drivers of the vehicles via different communication channels, such as TMC, radio reports, dynamic displays on sign gantries or the like. Using vehicle-to-vehicle communication, it is additionally possible for vehicles themselves to recognize and retransmit a queue in their surroundings on the basis of the information about the number and speed of the vehicles and possibly further information from the vehicle ambient sensors.

However, all of these methods allow the reason for the queue to be ascertained only in exceptional cases, because this usually requires further information from the police, from rescue workers or from other people concerned with traffic monitoring. For some time, there have additionally been what are known as queue reporters, who report their observations by calling radio stations or automobile clubs. In this case, the queue reporters also indicate the reason for the queue if it is known.

The controller 1 incorporated—in accordance with the invention—into a vehicle communication network 2 allows the advantages of queue reporters to be accumulated with the automatic recognition of queues by virtue of vehicle-to-vehicle communication and allows an increase in the reliability of the data.

If, by way of example, a driver drives his motor vehicle into a queue, he can send the queue to surrounding vehicles by pushing a button or using another man/machine interface as part of a multimedia control unit. It is also possible for the vehicle to recognize the queue itself on the basis of ambient sensors. Accordingly, when the queue is left, the end of said queue is transmitted to other road users in the course of vehicle-to-vehicle communication. This received information can then assist the automatic recognition in the surrounding vehicles and increase the probability of recognition thereof.

This is done in every vehicle by the computation unit of the controller 1 as part of queue recognition 21. The queue recognition 21 in the controller 1 is preferably also set up to append the reason for the queue to the information which is intended to be transmitted in the course of vehicle-to-vehicle communication at the same time. If this information is not available to the queue recognition 21, it can send a query to a man/machine interface 22 and request the reason for the queue having arisen. The input can be made by virtue of a key input, but also in the form of a voice memo or by sending an image or video at the same time if a camera is integrated in the vehicle. It is also possible for the computation unit 1 to use media conversion to convert the voice memo from the driver into a text message, for example, which can be transmitted more easily and with lower data involvement. Further options for messages are symbols selected from a set of prescribed queue reasons, for example, which symbols are then transmitted using a standardized code. This can then be done in a queue processing section 23.

In addition, the computation unit of the controller 1 can make a request in the man/machine interface 22, upon receiving an appropriate queue message, for the existence of the queue and the reason for the queue to be confirmed or denied. If the driver optionally reacts to this request, it can be sent to the other vehicles, which results in ever greater reliability of the information.

When this additional information is transmitted, it is necessary to ensure that the communication channel is not overloaded. Since there are typically very many vehicles in a queue and hence the communication channel has a very high utilization level, it is appropriate for this supplementary information to be transmitted as concisely as possible, for example as a standardized code or text message, so that the queue processing section is typically set up to convert a voice and/or video message into a text message by means of media conversion.

Should a relatively large amount of information in terms of data volume nevertheless be transmitted, it is appropriate to send a reference or link to the relatively large amount of information, which can then be retrieved on another communication channel, for example a WLAN. The bidirectional adhoc-network radio communication, which has limited data capacity, is used to transmit only the access data for the WLAN and/or the retrieval location. It is thus appropriate to send a direct dispatch of the text message with a link to the spoken message, which can then be retrieved at any time by the vehicle of other vehicles.

Following the queue processing 23, the controller 1 transmits the queue information 24 in the course of vehicle-to-vehicle communication, said queue information naturally also being intercepted by what are known as roadside units (RSUs) as well as by vehicles in the course of vehicle-to-X communication and being able to be processed further from that location by a control center. It makes sense to set up such roadside units at sensitive queue spots in the course of the vehicle-to-surroundings communication.

The controller 1 according to aspects of the invention performs the central evaluation of the information obtained from different information sources (communication, sensors, input by humans), that is to say centrally in the computation unit of the controller 1, which for this purpose uses ports 3 in the vehicle communication network to access other vehicle units. However, the central management takes place in the controller 1, which can therefore also easily be used for safety-related tasks besides for the aforementioned task as part of the queue recognition.

Specific examples of the queue recognition will be explained briefly below.

A driver A gets into a queue which has previously already been detected automatically by the controller 1 by means of vehicle-to-vehicle communication. On request in the man/machine interface 22, he confirms this queue by pushing a button. After some time, he recognizes that the queue has arisen on account of curious onlookers. He again pushes a queue button in his man/machine interface 22 and this time selects the option to transmit a reason for the queue as well. He then speaks the reason into his microphone. The queue processing section 23 in the computation unit of the controller 1 converts this information into a text message by means of media conversion and transmits it as a queue message 24 by means of vehicle-to-vehicle communication. In addition, a link to the WLAN of his vehicle is also sent, where the original voice message is kept for retrieval. This original voice message can be retrieved by virtue of drivers of adjacent vehicles in the transmission and reception range of the WLAN calling the link. Some time later, the queue slowly dissipates and driver A confirms that the queue has dissipated by pushing a button again. For the controller 1, it is in this case advantageous if the queue messages 24 also have positioning data 20 for the individual vehicle added to them.

In a further example, driver B receives the message about a queue which has been transmitted by driver C. However, since driver B cannot discern a queue, the driver B contradicts the queue report in the course of the queue recognition 21 in his man/machine interface 22. This information is also transmitted as a queue message 24 by means of vehicle-to-vehicle communication. Driver D now receives the information that there might be a queue but that it cannot be confirmed by the automatic queue recognition. After some time, further additional drivers also report that there is no queue. When these additional data have been received, the queue recognition 21 can decide not to display the queue reports to the driver any more in the man/machine interface 22.

In a further example, vehicle E approaches a queue. On the basis of the confirmation of the queue by other vehicles, the start of the queue can be recognized very precisely and this information can be displayed to the driver very precisely in the course of the queue recognition 21 in the man/machine interface 22. The update speed is also very high. This allows the driver to gear himself up to the end of the queue very precisely, the end of the queue always forming a high level of risk of serious shunt accidents. In addition, the confirmation of the end of the queue by other vehicles also allows the length and duration of the queue to be predicted very precisely. This can be taken into account for bypass communication by the vehicle, for example, which is implemented by a further vehicle unit.

LIST OF REFERENCE SYMBOLS

1 Controller for data processing in the bidirectional adhoc-network radio communication
2 Vehicle communication network
3 Communication ports
4 ITS-DSRC component
5 Intelligent antenna device
6 Antenna for cellular radio communication
7 Antenna for satellite radio communication
8 Antenna for bidirectional adhoc-network radio communication
9 ITS-DSRC component (ITS communication unit)
10 Emergency call unit
11 Airbag trigger signal
12 Man/machine interface
13 Antenna connection
14 Further vehicle units
15 Ports for vehicle sensors and ambient sensors
16 Positioning unit
18 Vehicle-to-vehicle communication
19 Data from vehicle sensors and ambient sensors
20 Positioning data
21 Queue recognition
22 Man/machine interface
23 Queue processing
24 Transmission of the queue message

What is claimed:

1. A controller located in a vehicle for data processing in bidirectional adhoc-network radio communication, including:
a computation unit for data processing, the computation unit being configured to process the data according to an ITS standard, and data processing of the computation unit performs processing steps of an ITS Facility layer which are limited to content-oriented evaluation and/or conditioning of the data which are received or transmitted by the bidirectional adhoc-network radio communication, the computation unit is not set up to process data according to an ITS access technologies layer, an ITS network layer or an ITS transport layer; and
a first wideband communication port is provided for the purpose of bidirectional communication with an ITS communication unit, the bidirectional communication including receiving the data from the ITS communication unit located in the vehicle,
wherein the received data was processed according to at least one of the ITS access technologies layer, the ITS network layer and the ITS transport layer by the ITS communication unit.

2. The controller as claimed in claim 1, wherein a second communication port is provided for sending data to the ITS communication unit.

3. The controller as claimed in claim 1, wherein a satellite data port is provided for receiving position data.

4. The controller as claimed in claim 1, wherein at least one port is provided for a vehicle sensor and/or ambient sensor.

5. The controller as claimed in claim 1, wherein the computation unit of the controller is set up to combine satellite position data and data from a vehicle sensor and/or ambient sensor.

6. The controller as claimed in claim 1, wherein the controller with the computation unit is set up on the basis of a high safety level.

7. The controller as claimed in claim 1, wherein a port to a multimedia control unit is provided.

8. The controller as claimed in claim 1, wherein the computation unit of the controller is set up to merge data received from a multimedia control unit, from a vehicle sensor and/or ambient sensor and/or by a bidirectional adhoc network and to produce preprocessed data therefrom according to the ITS standard.

9. The controller as claimed in claim 1, wherein the computation unit is set up to perform preprocessing on the communication data.

* * * * *